United States Patent [19]

Mills

[11] 4,152,793
[45] May 8, 1979

[54] FLUSH TANK WATER SAVER

[76] Inventor: Daniel J. Mills, 1657 Via Alegre, San Dimas, Calif. 91773

[21] Appl. No.: 807,732

[22] Filed: Jun. 15, 1977

Related U.S. Application Data

[63] Continuation-in-part of Ser. No. 719,373, Sep. 23, 1976, abandoned.

[51] Int. Cl.$^2$ .......................... F03D 1/00; F03D 5/094
[52] U.S. Cl. ............................................ 4/325; 4/363; 4/415
[58] Field of Search ............... 4/67 A, 67 R, 34, 35, 4/57 P, 57 R, 41, 37, 40, 415, 324, 392, 394, 395, 325, 405, 345, 346, 326, 364, 366, 367; 150/0.5

[56] References Cited

U.S. PATENT DOCUMENTS

| | | | |
|---|---|---|---|
| 2,643,393 | 6/1953 | Karr | 4/57 P |
| 2,892,197 | 6/1959 | Flieder | 4/57 P |
| 3,344,439 | 10/1967 | Davies | 4/35 |
| 3,543,309 | 12/1970 | Boone | 4/41 |
| 3,939,887 | 2/1976 | Scarnato | 150/0.5 |
| 3,939,888 | 2/1976 | Scarnato | 150/0.5 |
| 4,044,407 | 8/1977 | Silcox | 4/40 |

*Primary Examiner*—Henry K. Artis
*Attorney, Agent, or Firm*—Wm. Jacquet Gribble

[57] ABSTRACT

An inner tank or reservoir is mounted in the conventional flush tank of a sanitary toilet or commode. The tank may be rectangular and have an open top and a closed bottom. An outlet in a vertical wall is closable by a buoyant sphere. The sphere may be free-floating and guided to the outlet by a cage. Alternatively the sphere may be lever-mounted and pivotable in and out of sealing contact with the outlet. A bellows operated from an air pump displaces the sphere from closed relationship to the outlet. Preferably the pump is exterior of the toilet flush tank and connected to the bellows by a flexible plastic conduit.

The conventional tank is flushable in conventional manner from its outside handle and the capacity of the inner tank may be added to the water flow by the operation of the air pump.

8 Claims, 4 Drawing Figures

U.S. Patent  May 8, 1979  Sheet 1 of 2  4,152,793
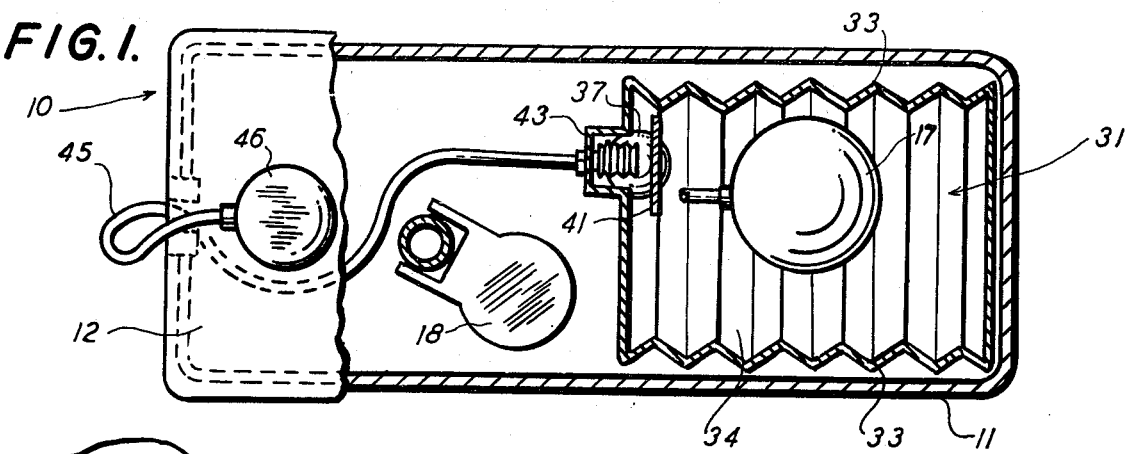
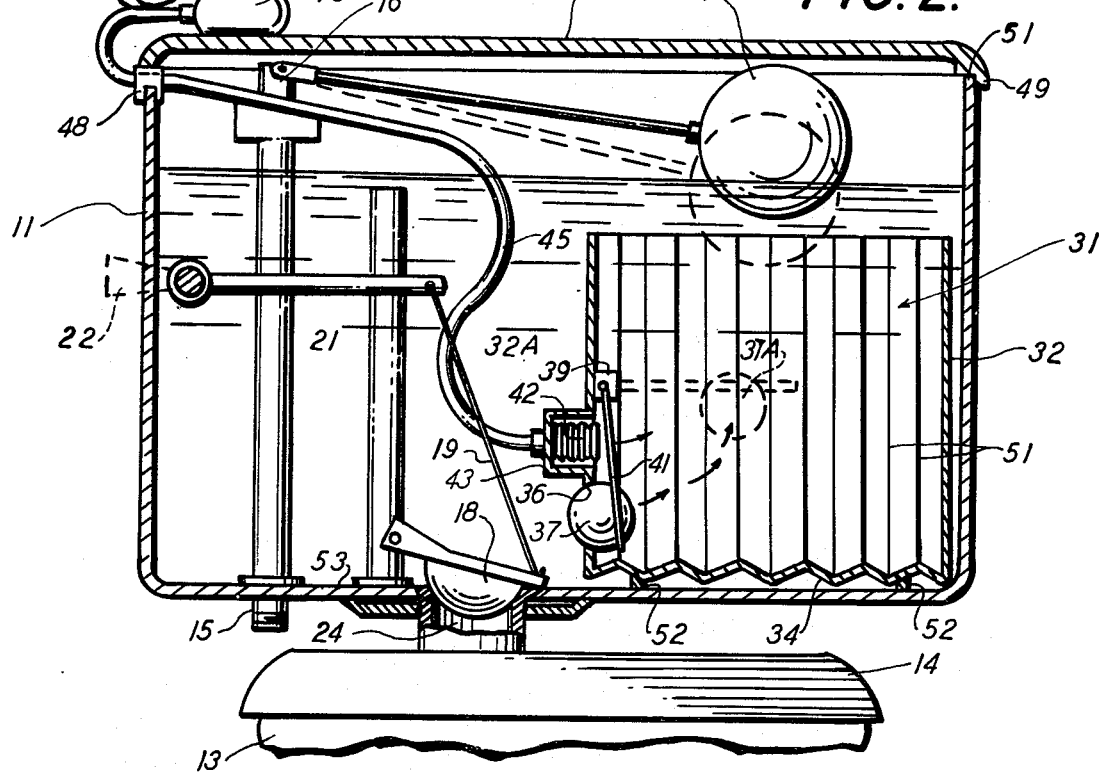

FLUSH TANK WATER SAVER

RELATED APPLICATIONS

This application is a continuation-in-part of my presently pending application Ser. No. 719,373 filed Sept. 23, 1976 and entitled Water Closets now abandoned.

BACKGROUND OF THE INVENTION

The invention relates to water saving devices and more particularly to apparatus for alternatively utilizing the full capacity or a portion of the full capacity of a conventional water closet flush tank.

Many water saving devices have been invented and offered to the public. Most are not installable by the average householder or do not offer alternative flushing volumes. By providing an inner tank which releaseably contains a portion of the flush tank volume, the instant invention offers positive control of the amount of flush water delivered to the toilet bowl in a device which is installable by the average householder and does not interfere with the operation of the conventional portion of the flush tank.

SUMMARY OF THE INVENTION

The invention contemplates, in a conventional toilet flush tank having a water inlet controlled by the water level within the tank and a manually operated outlet valve, the combination which comprises an inner reservoir supportable within the confines of the conventional flush tank and having an open top and enclosing sides and bottom. An outlet in one of the sides is closable by valving which may be a buoyant sphere. The sphere may be hinge-mounted so as to swing into the outlet, or alternatively, may be free to float away from the outlet and be guided thereto by a valve ball cage. An actuating bellows is mounted near the outlet so that its expansion impinges upon the valving element to remove the element from the outlet to permit water flow from the inner tank into the volume of the flush tank. Preferably a finger-operated air pump is mounted exteriorly of the flush tank and connected to the bellows by a flexible conduit.

The apparatus of the invention affords selective flushing of the volume of tank water outside of the inner reservoir or of both that water and the contents of the inner reservoir as desired by selective manipulation of the air pump and the conventional manual valve handle exterior of the flush tank.

The inner reservoir of the invention may be rested on the flush tank bottom on self-contained feet or may be suspended from the flush tank rim by a bracket, as desired.

In a preferred embodiment the inner reservoir is comprised of accordion-pleated walls and bottom such that it may be folded to the desired outer dimensions to accommodate itself to the particular conventional flush tank into which it is placed. The apparatus of the invention is thus easily installed by the average householder, requires no maintenance and no outside power sources.

These and other advantages of the invention are apparent from the following detailed description of the drawing.

BRIEF DESCRIPTION OF THE DRAWING

FIG. 1 is a plan view, partly in section, of a preferred embodiment of the invention combined with a conventional commode flush tank;

FIG. 2 is a sectional elevation schematically representing the embodiment of FIG. 1 prior to flushing;

In the various Figures like reference characters are used to designate like parts.

DESCRIPTION OF THE PREFERRED EMBODIMENTS

Figure 3:
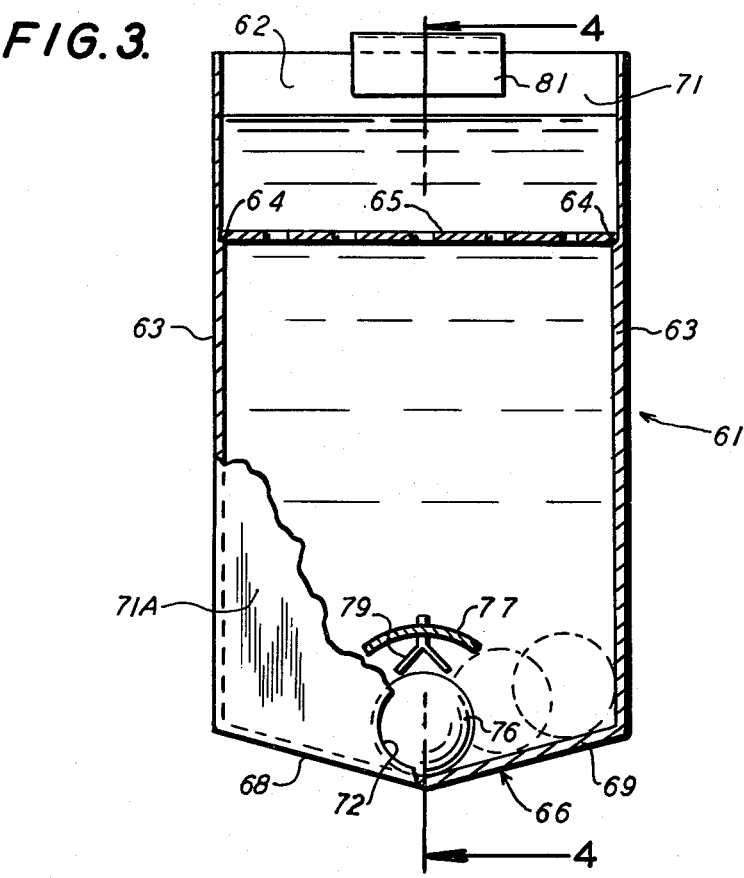
FIG. 3 is an end elevation, partly in section, of an alternate embodiment of the invention showing a free floating valving element.

FIGS. 1 and 2 show a conventional sanitary toilet or commode 10 which has a flush tank 11, a cover 12, a stool 13 shown fragmentarily and a seat 14. The elements of the conventional flush tank are shown in schematic fashion since their function and makeup is well known in the art. Those elements comprise an inlet pipe 15, water valve 16 controlled by the water level float 17, and flush valve 18 connected by cable 19 to flush lever 21 which in turn connects to exterior flush handle 22 (shown in broken lines). Valve 18 closes off a flush channel 24 which connects to the commode in conventional fashion.

The conventional flush tank usually holds five gallons of water but for many purposes 3 gallons is sufficient for a sanitary flush of bowl 13. With most flushes two gallons of water is wasted. The invention therefore provides an independently operable inner reservoir 31 with a nominal capacity for two gallons. In the disclosed embodiment, the reservoir has vertical ends 32 and accordion-pleated sides 33 and an accordion-pleated bottom 34 which define a reservoir with an open top. End wall 32A has a generally cylindrical outlet 36 near the convergence of the end wall and bottom 34. A spherical valve 37 is shown in FIGS. 1 and 2 closing outlet 36. The valve is substantially spherical, buoyant and pivotally suspended from wall 32A by a bracket 39 and a hinge leaf 41.

An expandable bellows 42 is secured in a side chamber 43 of end wall 32A adjacent hinge leaf 41. A flexible conduit 45 connects the bellows to an air pump 46 which may rest on cover 12 of the conventional flush tank. The conduit exits the interior of tank 11 through a seal 48 which prevents the lip 49 of cover 12 from pinching the conduit against an upper rim 51 of the flush tank.

Operation of the Preferred Embodiment

Assuming the filled condition shown in FIG. 2, the user of the apparatus of the invention has the choice of a three gallon or five gallon flush. The three gallon flush is implemented by the conventional manipulation of the exterior handle 22 shown in broken lines in FIG. 2. Such manipulation lifts valve 18 from flush channel 24 and the three gallons within the conventional flush tank outside of reservoir 31 exits the tank into bowl 13. Should a more thorough flush be desired handle 22 is manipulated in conjunction with air pump 46. Digit pressure on pump 46 expels fluid from the pump and expands the bellows 42 against hinge leaf 41, displacing valving element 37 from outlet 36 to the dotted position 37A in FIG. 2, opening outlet 36 such that the two gallons within the reservoir 31 may commingle with the flow of the exterior three gallons into the bowl.

Because of the buoyoncy of valving element 37, a minimal displacement of the hinge leaf 41 from its substantially vertical position in FIG. 2 allows the element to float upwardly to the position 37A, thus opening the outlet 36.

During refilling of the tank as float valve 17 descends on the diminishing liquid level and opens inlet valve 16, water flow tends to impress upon valve 37, keeping outlet 36 open until a substantial head is developed within reservoir 31. Thereafter the outward pressure results in valve 37 remaining closed until again actuated by the expansion of bellows 42. Should air pump 46 not be actuated no transfer of liquid occurs from reservoir 31 and the commode bowl 13 receives only the three gallons within the rest of flush tank 11.

The reservoir of the embodiment of FIG. 1 is easily installed since it can be compressed along the pleat lines 51 of the sides and of the bottom until positioned on its contained legs 52 on a floor 53 of the flush tank. Thereafter the reservoir can be expanded by means of the accordion pleats to a size commensurate with the gallonage desired to be reserved and commensurate with the free mechanical operation of the conventional portions of the flush tank.

Description of the Alternate Embodiment

Figure 4:
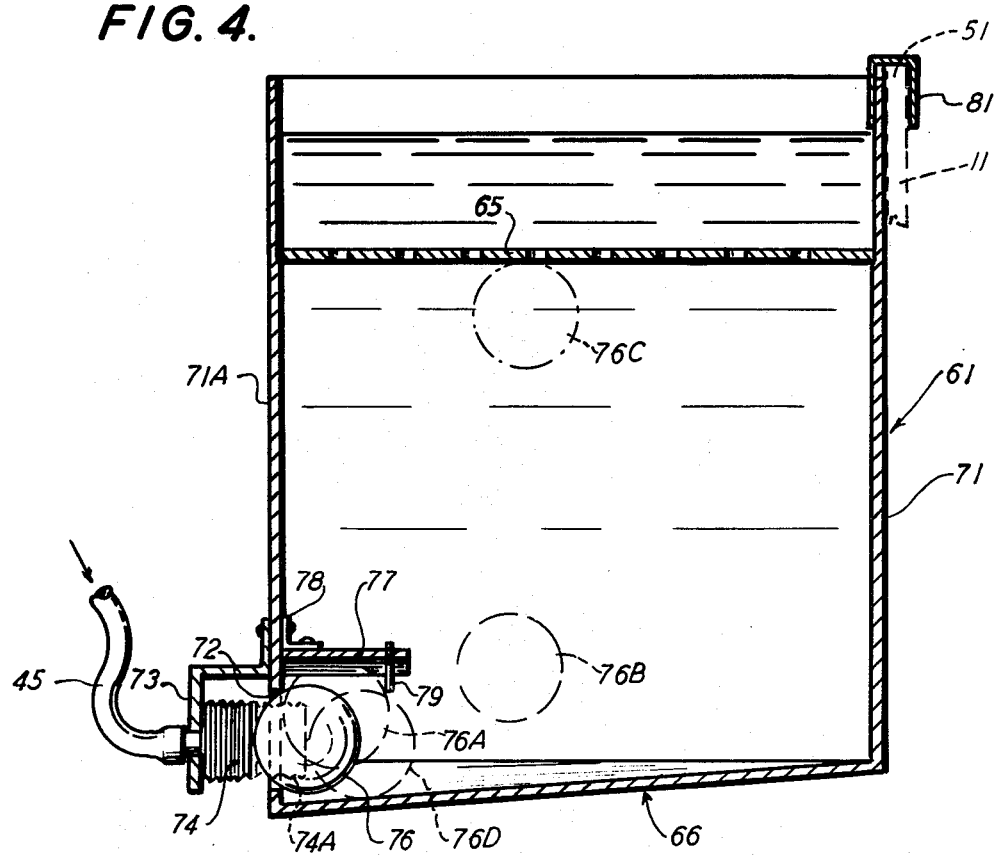
FIG. 4 is a sectional elevation taken along line 4—4 of FIG. 3.

FIGS. 3 and 4 show a reservoir 61 having a top opening 62 and side walls 63 spaced apart a distance less than the transverse dimension of the flush tank. The upper portions of side walls 63 are stepped to form shoulders 64 upon which a valve screen 65 resides. Bottom 66 of the reservoir 61 has two sloping portions 68,69 which converge along a central line to create a trough sloping downwardly from an end wall 71 to opposite end wall 71A.

End wall 71A has a cylindrical wall which defines an outlet 72 near the bottom of the wall adjacent the lower end of the trough. A bracket 73 offset from wall 71A supports an expandable bellows 74 which is connected by a flexible conduit 45 to an exterior air pump like the air pump 46 of the embodiment of FIG. 1. A freely floatable spherical valve element 76 is shown closing the outlet defined by wall 72 in FIG. 4 and in FIG. 3. Until the bellows is actuated element 76 is retained within closed position by the head of water within reservoir 61. The ball is caged by a semi-cylindrical cantilever wall 77 which is fixed to end wall 71A by a bracket 78. A bifurcated flexible stop 79 inboard of wall 77 retains floating element 76 under normal conditions as indicated by the broken lines 76A. Water may flow in through outlet 72 without removing the valve element from the cage. However, under the urging of an expanded bellows 74A, the element is expelled beyond flexible stop 79 into free floating position 76B and may float to position 76C against screen 65 until the water in reservoir 61 is exhausted through outlet 72.

When the water is exhausted the float recedes to bottom 66 and rolls by gravity down the trough to the position 76D beneath the bifurcations of the stop 79. The eventual filling of reservoir 61 creates a head which forces the element from the position 76B to the closed position of element 76 as shown in full lines in FIG. 4.

In both of the embodiments the lower outlet at times becomes an inlet until there is an equilibrium which closes the valve. Thereafter the reservoir may be filled by spillover from the normal flush tank content through the open top of reservoirs 31 and 61.

The embodiment of FIG. 3 may be placed in the conventional flush tank and secured there by a bracket 81 shown fixed to reservoir end wall 71. The bracket may be placed over upper rim 51 of flush tank 12 (see FIG. 2) and is sufficiently thin to not disturb the fit between rim 51 and downward lip 49 of cover 12.

While the invention has been completely disclosed by the illustrative embodiments herein described, the scope of the invention encompasses variations other than those shown which may occur to those skilled in this particular art. It is therefore desired that the invention be measured by the appended claims rather than by the illustrative embodiments set forth herein.

I claim:

1. Liquid control appartus for a liquid flush tank having a controlled inlet for liquid under pressure responsive to tank liquid level and a manually controlled outlet to an open bowl and comprising a plurality of contiguous walls defining a liquid reservoir containable in said tank, an outlet adjacent the bottom of said reservoir, and an inlet at the top of said reservoir both connecting to the interior of said tank; an outlet valve element adapted to close said outlet, and fluid-filled means responsive to applied pressure adapted to displace said valve element from said outlet for liquid interchange between said tank and said reservoir.

2. Apparatus in accordance with claim 1 wherein said valve element is buoyant.

3. Apparatus in accordance with claim 2 wherein said valve element is pivotably secured to one of said reservoir walls.

4. Apparatus in accordance with claim 3 wherein said valve element comprises a sphere.

5. Apparatus in accordance with claim 2 further comprising a valve element cage having an upper guide, a lower guide, and a flexible stop remote from said outlet.

6. Apparatus in accordance with claim 5 wherein said valve element is a free floating sphere.

7. Apparatus in accordance with claim 1 wherein said fluid filled means comprises a flexible air pump, an expandable bellows, means supporting said bellows adjacent said outlet valve element, and an air conduit connecting said air pump to said expandable bellows.

8. Apparatus in accordance with claim 7 wherein said reservoir comprises substantially vertical end walls, said outlet being in one of said walls, an open top defining said inlet, a reservoir bottom, and side walls between said end walls, each of said bottom and sidewalls being accordion pleated for varying reservoir size.

* * * * *